April 25, 1933.  J. C. CARLIN  1,905,365
METHOD OF MAKING INNER TUBES
Filed Sept. 24, 1932  2 Sheets-Sheet 1
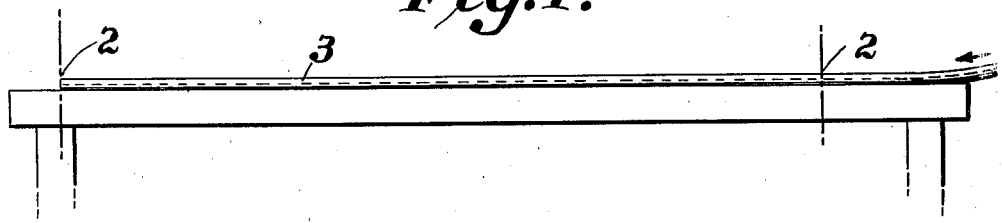
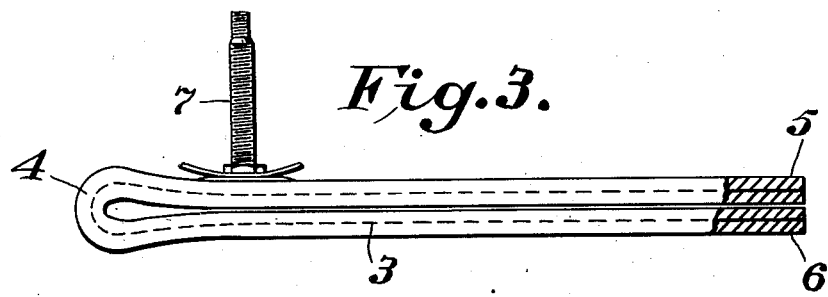
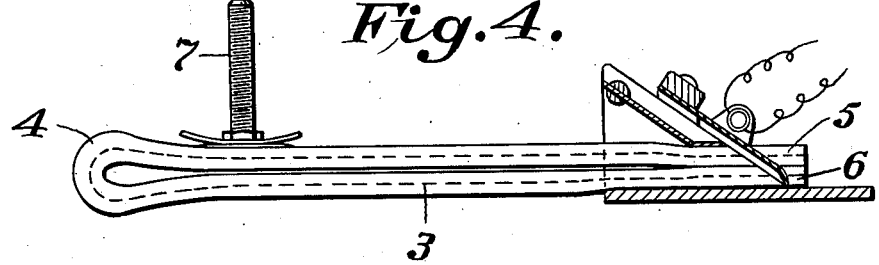
Inventor:
James C. Carlin,
By Parker Cook,
Attorney.

Patented Apr. 25, 1933

1,905,365

UNITED STATES PATENT OFFICE

JAMES C. CARLIN, OF NORRISTOWN, PENNSYLVANIA, ASSIGNOR TO LEE RUBBER AND TIRE CORPORATION, OF CONSHOHOCKEN, PENNSYLVANIA, A CORPORATION OF NEW YORK

METHOD OF MAKING INNER TUBES

Application filed September 24, 1932. Serial No. 634,730.

My invention relates to new and useful improvements in inner tubes and the method of making the same, and more particularly to the manner in which the ends of the stock are cut and spliced.

As is well known to those skilled in the art, the conventional method of forming the inner tube consists in preparing the uncured compound by extruding or otherwise properly shaping the stock into tubular form, cutting to the proper dimensions, and then joining the ends.

In the forming of the splice by the conventional method, one end of the stock is buffed or skived on a relatively wide bevel, while the other end of the stock is either buffed or skived on a similar correspondingly wide bevel, after which the ends are treated and forced together to form the endless tube.

Also, in this cutting and forming of the splice by the conventional method, one end of the tubular stock is buffed or skived on a relatively wide bevel, after which the other end of the tubular stock is turned inside out, and also buffed or skived on a supposedly corresponding bevel, after which the two ends of the tubular stock are telescoped, submitted to pressure and cured or vulcanized.

If the inner tube is a relatively thin one, the tubing is cut off to proper length by shears or scissors, and the one end of the tube then buffed to a bevel, as the buffing wheel will remove enough rubber on a relatively thin tube, after which the other end of the stock is turned inside out and also roughened.

If the tube, however, is a relatively thick one, the one end is skived and the other end of the tube is then turned inside out and cut to the corresponding bevel with a skiver.

However, when the tubes are spliced in this manner, there is an annular section at the splice where the tube wall is of greater thickness than the surrounding wall and less flexibility and extensibility are noted in this section when the tube is inflated.

This relatively heavy cuff or ring in the tube produces unequal stresses when the tube is in service within a tire casing, and the area immediately adjacent the cuff is apt to fail, due to the increase in the flexing action in the tube at this point.

Therefore, with the above-mentioned practice, the splice or the rubber adjacent the splice is not as serviceable as the remainder of the tube.

One of the objects of the present invention, therefore, is to form an inner tube wherein the splice will be relatively narrow in width to thus do away with the wide annular cuff or ring, which is often a weak spot in a tube.

Still another object of the invention is to produce a splice that is highly efficient, and wherein the usual buffing and skiving operation, together with the telescoping of the ends, is entirely eliminated.

Still another object of the invention is to form a tube wherein the two ends of the stock, that is, the four thicknesses of rubber, may be similarly angularly cut in the one action, and the ends either treated simultaneously with the cutting, or thereafter, as desired. The tube is then refolded and the ends matched to form a continuous wall through the splice, after which the ends may be rolled or pressed firmly together, and the tube vulcanized or cured to complete the unit, the splice in this instance, being as strong as the surrounding body of the tube.

Still another object of the invention is to produce a tube wherein the measured tubular stock is folded over centrally, the two free ends coinciding, after which a cut is made at a point slightly away from the ends, so that there will be but little scrap, the cut being made preferably at a thirty-five degree angle, and through the superimposed walls of the tubing, the cuts of the folded material extending along a parallel axis.

The cut is preferably made with a hot knife, although a cold knife may be used and the ends afterwards heated or otherwise treated in a manner to leave the ends in a clean and semi-plastic state.

The stock is then refolded, so that the ends may now be matched, rather than telescoped, as in the conventional method, and the ends then subjected to mechanical pressure or otherwise pressed, and the tube then cured in the vulcanizer.

Still another object of the invention is to produce a splice wherein the length of the bevelled portions is no greater than twice the thickness of the stock, and wherein the angle of the cut is preferably between thirty-five and forty-five degrees, although this angle may be varied, as will be hereinafter mentioned.

Still another object of the invention is to provide a method wherein the tubular stock may be cut in desired lengths, the stock then folded, and all the bevels formed with the one operation, that is, an angular cut through the folded layers, preferably with a hot knife, or the ends afterwards properly heated, the tube refolded and the bevelled edges then matched or butted, thus assuring perfectly matched angular ends. Thus, the buffing or skiving of both ends separately, and the telescoping of the ends, are eliminated, all of which take considerable time in the conventional method and produce a wide cuff or ring, which is detrimental to the tube.

With these and other objects in view, the invention consists in certain new and novel arrangements and combination of parts, as will be hereinafter more fully described and pointed out in the claims.

Referring now to the drawings showing a preferred embodiment of my invention and the method by which the article may be produced, Fig. 1 is a view of the stock from a tubing machine, to be cut in the desired length, as shown by the dotted line;

Fig. 2 diagrammatically shows a conventional form of splice, and how one end of the tube is telescoped within the other;

Fig. 3 is a view showing a desired length of stock, having been folded centrally with its free ends coinciding, preparatory to being cut in the manner to be hereinafter described;

Fig. 4 is a view of the folded stock, diagrammatically illustrating a machine having a heated knife, for cutting through the folded layers at an angle of thirty-five degrees to produce the desired bevel;

Referring now more specifically to the several views, there is shown in Fig. 1 a piece of rubber stock, which is to be cut in desired lengths, as at 2.

It will be understood that this stock has been prepared in the conventional manner, and any suitable type of inner tube compound may be used.

It will also be understood that each section 3 of the stock is slightly longer than in its finished form, as the free ends are to be cut on a bevel, as will shortly be described.

In Fig. 2, there is diagrammatically shown the conventional form of splice, that is, the outer surface of one end of the tube is folded inside out and the inner surface buffed or skived, so that the one end may fit or telescope within the other. This form of splice forms the relatively wide cuff or ring, which is detrimental to the life of the tube, sometimes causing the rubber to fail adjacent the cuff when the tube is in service. Furthermore, considerable time is wasted in making this form of splice, and the angle of the bevels of these telescoping ends are seldom complements, thus producing a very rough and uneven inner surface annularly within the tube.

Now in Fig. 3, there is shown one of the sections of tubing 3 being doubled or folded midway its length, as at 4, so that the free ends 5 and 6 coincide, the several layers, of course, of the tube being superimposed.

It might be mentioned that before the stock is so folded, the tubing has been pierced and the valve stem 7 applied.

Now, instead of cutting and buffing the ends of the tube and turning one end of the tube inside out, I place the folded tube in a cutting machine, as shown in Fig. 4, and clamp the two coinciding ends firmly, so that preferably a heated knife may splice or cut through the folded layers at an angle of, preferably, thirty-five degrees, and the ends afterwards perfectly matched, instead of telescoped.

In a companion application about to be filed, a cutting machine for cutting or forming these ends is shown and claimed and described in detail.

Figure 5:
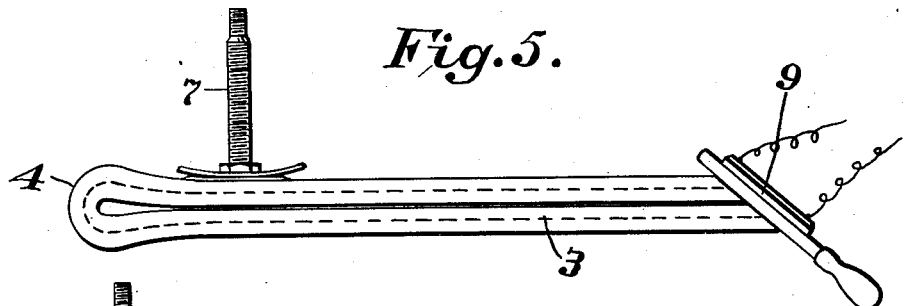
Fig. 5 is a similar view of the folded stock, diagrammatically showing a method for heat-treating the bevelled ends if a heated knife is not used.
Figure 6:
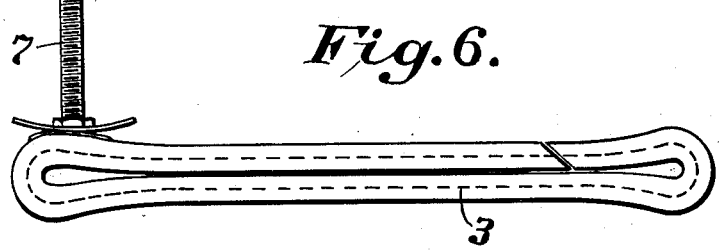
Fig. 6 is a view of the refolded tube and the severed ends about to be matched and pressed together.
Figure 7:
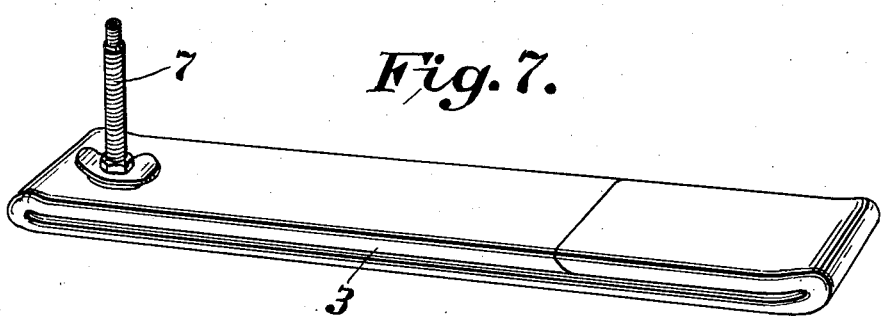
Fig. 7 is a perspective view of the tube after the same has been spliced.

It is not absolutely necessary that the cut be made with a heated knife, as the free ends may be cut with a cold knife at an angle of, say thirty-five to forty-five degrees, and the resultant bevelled ends of the tube may be heated by the employment of a small electric heating iron, as shown at 9 in Fig. 5.

It will also be understood that it is even possible to treat the uncured ends with a suitable solvent or cutting with a wet knife, or with a knife that has been wet with rubber latex solution, or buff or grind the ends. In any event, after the ends have been cut at substantially a thirty-five degree angle, and treated, so that they are in a semi-plastic and tacky state, the tube is refolded so that the ends 5 and 6 may now be matched, after which they are rolled or pressed firmly together, then placed in the vulcanizer (not shown) and properly cured.

It will be understood that by matching the ends, I mean that after the ends have been beveled the one beveled end is folded over and superimposed on the other beveled end of the stock, and as these bevels are both formed with a single stroke of the knife, the ends, of course, are exact complements.

Figure 8:
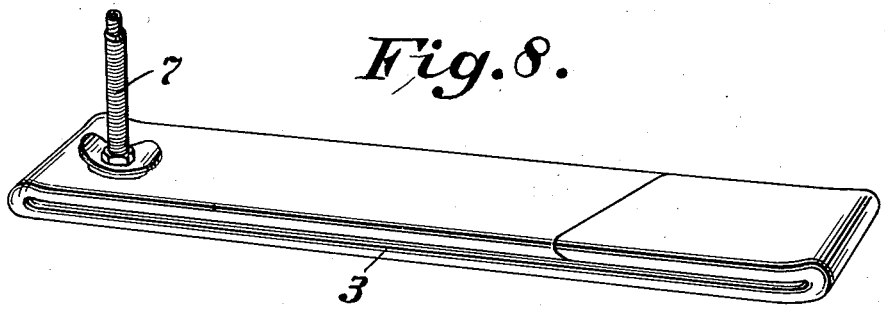
Fig. 8 is a view showing how the tube might be cut in an angular relation, rather than at right angles to the longitudinal axis of the tube.

It will be understood that the cut across the ends of the tube might be straight, that is, at right angles to the longitudinal axis of the layers, or it might be in angular relation, as shown in Fig. 8.

It will be seen that by forming the splice in the manner above shown, the overlapping portions that form the splice are relatively narrow in width, thus doing away with the usual wide cuff or annular ring in the tube, which not only often causes failure of the tube, but will often cause a casing to wear more quickly at this point, due to greater resistance of the splice against the casing.

Furthermore, it will be seen that by forming this joint with a bevel at substantially a thirty-five degree angle, the buffing and skiving heretofore necessary are eliminated and the bevelled ends are complements, so that the fit is a more perfect one, and the usual wide cuff, with its disadvantages, is done away with.

Although the method of cutting through the four layers of the folded material at the one cut to bevel the ends is preferred, still I consider it within the scope of my invention to bevel the two ends of the stock independently, that is, rather than folding the tube and cutting through the four thicknesses at one time, I can bevel the ends independently by not folding and cutting through but two thicknesses at the one time.

It will be understood that the angle of the slice might be varied from that described, and I have found that from thirty-five to forty-five is the most preferable, although it is possible that the cut might be on as small an angle as twenty degrees, and as great an angle as seventy-five or eighty degrees. However, if the angle is too small, there will be a feathered edge that will be hard to work with, and if the angle is too great, there is a tendency for the ends to push apart when the pressure is applied, rather than to be pushed together.

Although the invention and method have been illustrated as applying to inner tubes for tires, it will be understood that it might be successfully used with rubber surgical goods, rubber toys, and other similar articles, where a spliced seam of superior tensile strength is desired, wherein the splicing is practically invisible after vulcanizing, and wherein a splice is wanted that is not likely to deteriorate under service conditions.

Having thus described my invention, what I claim as new and desire to secure by Letters Patent is:—

1. A method for forming inner tubes and the like which consists in cutting rubber tubing stock to desired lengths, folding the tube centrally whereby the free ends will coincide, bevelling the free ends in parallel relationship, treating the ends, refolding and matching the said ends, preliminarily holding the ends together and then vulcanizing the said tube.

2. A method for forming inner tubes and the like which consists in cutting rubber tubing stock in desired lengths, applying a valve stem, folding the tube centrally whereby the free ends will coincide, bevelling the ends in one cut, treating the ends whereby the same will be in a semi-plastic condition, refolding and joining said ends and then vulcanizing said tube.

3. A method for forming inner tubes and the like which consists in cutting rubber stock in lengths slightly longer than in their final form, folding the tube about centrally of its length and superimposing the folds, clamping the free ends so that they substantially coincide, slicing the various layers of the folds in parallel axial relationship at a point slightly removed from the ends to thereby form bevelled end walls, treating the said bevelled end walls, refolding the stock, preliminarily joining the matched ends and then vulcanizing the tube.

4. A method for forming inner tubes and the like which consists in cutting rubber stock in desired lengths, placing a valve stem in the tube, folding the tube whereby the free ends will coincide, cutting off the ends of the stock at an angle between twenty and seventy degrees, treating the ends whereby the same will be in a semi-plastic condition, refolding the stock and matching the said ends and vulcanizing the tube.

5. A method for forming inner tubes and the like which consists in cutting vulcanizable inner tube stock in desired lengths, folding the tube whereby its free ends will coincide, clamping the free ends and slicing off a small piece of stock near the ends with a hot knife at an angle from the vertical to provide matched bevelled ends, joining the matched ends, submitting the same to pressure and vulcanizing the tube.

6. A method for forming inner tubes and the like which consists in cutting vulcanizable inner tube stock into desired lengths, applying the valve stem, folding the tube whereby its free ends will be superimposed and coincide, clamping the ends, simultaneously forming a bevel on all the layers of the ends of the tube and at the same time causing the bevelled ends to be in a semi-plastic state, refolding the tube and matching the bevelled ends and vulcanizing the tube whereby the same will be endless in form.

7. A method for forming inner tubes and the like which consists in cutting vulcanizable inner tube stock to length, folding the stock whereby the free ends will coincide, bevelling the ends in parallel axial alignment, heat-treating the ends, matching the bevelled ends and vulcanizing the tube.

8. A method for forming inner tubes and the like which consists in cutting uncured inner tube stock in desired lengths, folding a length of tubing whereby its free ends will substantially coincide, cutting the various walls of the stock at the said ends at an angle substantially between thirty-five and forty-five degrees, treating the ends whereby the same will be in a semi-plastic condition, adjoining the matched complementary ends and submitting them to a preliminary pressure and vulcanizing the tube.

9. A method of forming inner tubes and the like which consists in cutting uncured tube stock in desired lengths, bevelling the ends to form complementary angles, treating the ends whereby the same will be in a semi-plastic condition, adjoining the matched complementary ends and submitting them to a preliminary pressure, and vulcanizing the tube.

In testimony whereof I affix my signature.

JAMES C. CARLIN.